March 22, 1957    A. V. NANNI    Re. 24,288
SPEED CHANGING DEVICE
Filed July 21, 1954    2 Sheets-Sheet 1
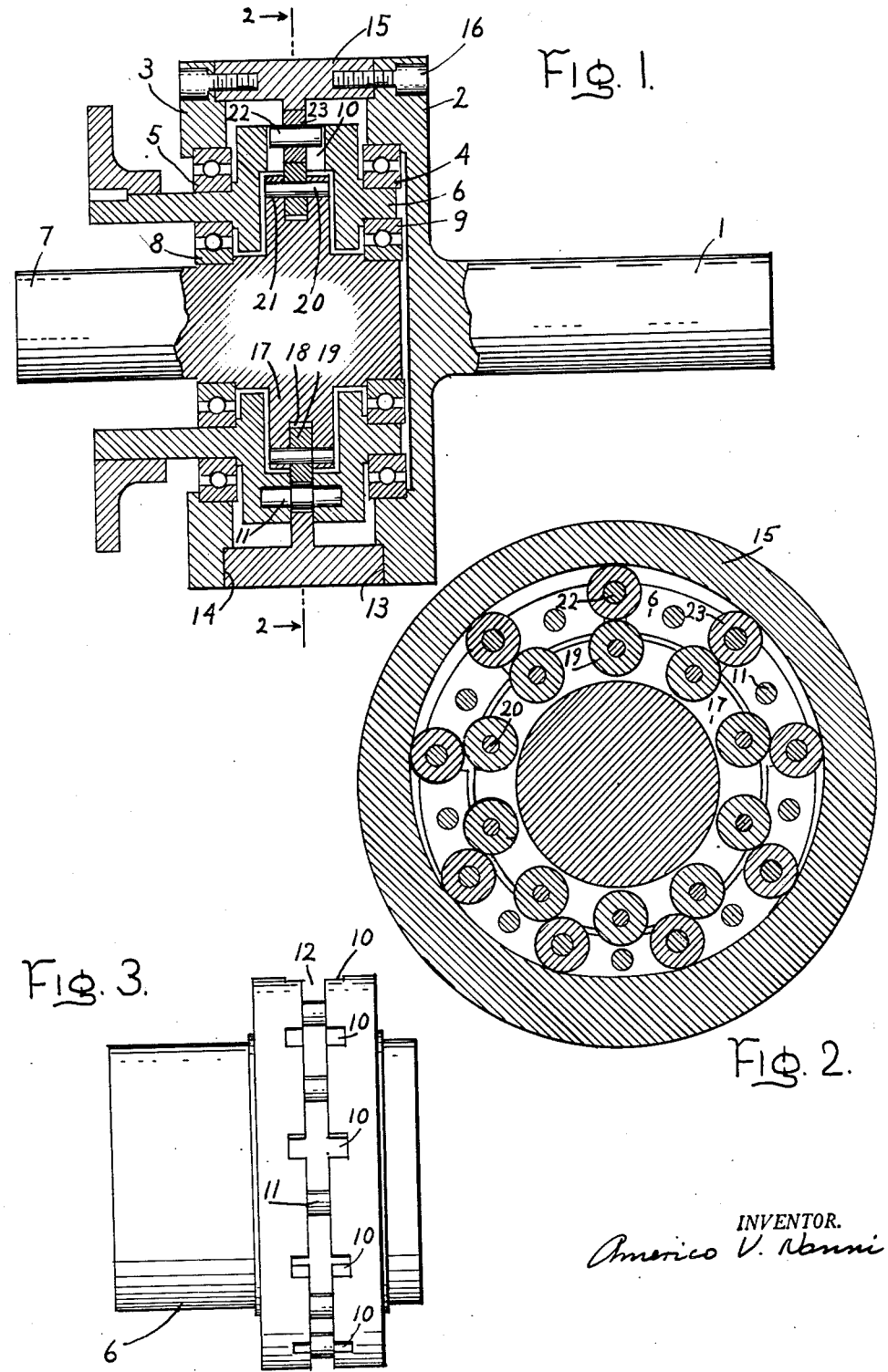
INVENTOR.
Americo V. Nanni March 22, 1955　　　A. V. NANNI　　　2,704,459
SPEED CHANGING DEVICE Filed July 21, 1954　　　　　　　2 Sheets-Sheet 2

INVENTOR.
Americo V. Nanni

United States Patent Office 2,704,459
Patented Mar. 22, 1955

2,704,459

SPEED CHANGING DEVICE

Americo V. Nanni, Woodcliff Lake, N. J.

Application July 21, 1954, Serial No. 444,783

3 Claims. (Cl. 74—63)

This invention relates to axially-aligned speed changing transmissions and is particularly directed to the problem of eliminating friction and vibration in such transmissions.

The thought of positive power transmission has always been associated with gears. In many different forms, but still, in effect, gears, discs that have teeth to keep them from slipping when engaging another toothed disc or being engaged by a worm screw.

In this application it is proposed to establish that an efficient speed reducer can be constructed by the use of cams and rollers. A mechanism of this type can withstand extremely heavy loads because the pressure is distributed evenly over almost half the circumference of a driven member while at the same time avoiding the wear and loss of power caused by friction of gear teeth.

Speed ratios are the same, generally, as those obtainable with speed reducers of the eccentric planetary type. An undesirable characteristic of the last mentioned speed reducers is that their heavy eccentric rotating masses produce vibration. Efforts to control this vibration have led to the addition of more parts to an already complicated mechanism. Accordingly, it is a further object of this invention to provide an axially-aligned speed reducer that can be constructed without eccentrics.

Other objects of the invention will become apparent upon reading the annexed detailed description in connection with the drawings where:

Fig. 1 is a side elevational view, partly in section, of a typical speed reducing transmission unit embodying the principles of the invention.

Fig. 2 is a cross section view, taken along line 2—2 of Fig. 1.

Fig. 3 shows details of stationary member 6, coupling removed.

Figure 4:
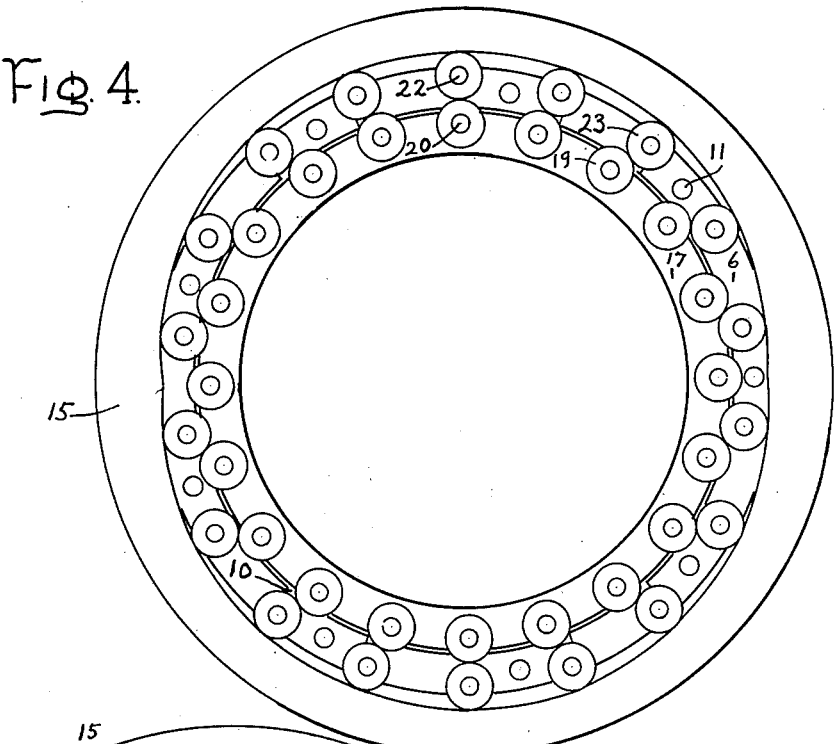
Figs. 4 and 5 are the same as Fig. 2 except for the number of rollers.

Referring now to Fig. 1, there is shown an embodiment of this invention where drive shaft 1 has integral therewith a flange portion 2, a flange 3 being the counterpart of said flange portion 2, each flange respectively journaled in antifriction bearings 4 and 5 on stationary member 6, and driven shaft 7 journaled in antifriction bearings 8 and 9 in internal recesses of same stationary member 6.

As shown more clearly in Fig. 3, stationary member 6 is made up of two halves for convenience of assembly and also to facilitate machining of slots 10. These two halves are held together by stepped dowels 11. These dowels also serve to maintain proper space 12 between the two halves.

Returning to Fig. 1, flanges 2 and 3 are recessed at 13 and 14 to receive drive cam 15 all three parts firmly held together by socket cap screws 16.

Driven shaft 7 has on its large diameter 17 a groove 18 cut deep enough as not to interfere with rotation of rollers 19.

Pins 20 are parallel to both drive and driving shafts, equidistant from their axes, and spaced equally annularly. They are rigidly secured in holes 21 of driven shaft 7, and each is provided with a freely rotating roller 19.

A second set of pins 22 also are provided with freely rotating rollers 23. However, this second set of pins 22 are free to roll radially within slots of stationary member 6. Rollers 23 are restrained laterally by the width of space 12 which is just wide enough to permit said rollers 23 to move radially without interference. The number of rollers 19 differ by one or more from rollers 23.

As can now be seen, by rotating drive cam in either direction, pressure will be applied to rollers 23. As these are confined to radial displacement by grooves 10 of stationary member 6, they will in turn engage rollers 19 and thus impart angular rotation to driven shaft 7.

Thus the transfer and reduction of angular rotation from the drive shaft to the driven shaft is accomplished without any sliding or rubbing motion. All the parts concerned operate by rolling.

Figure 5:
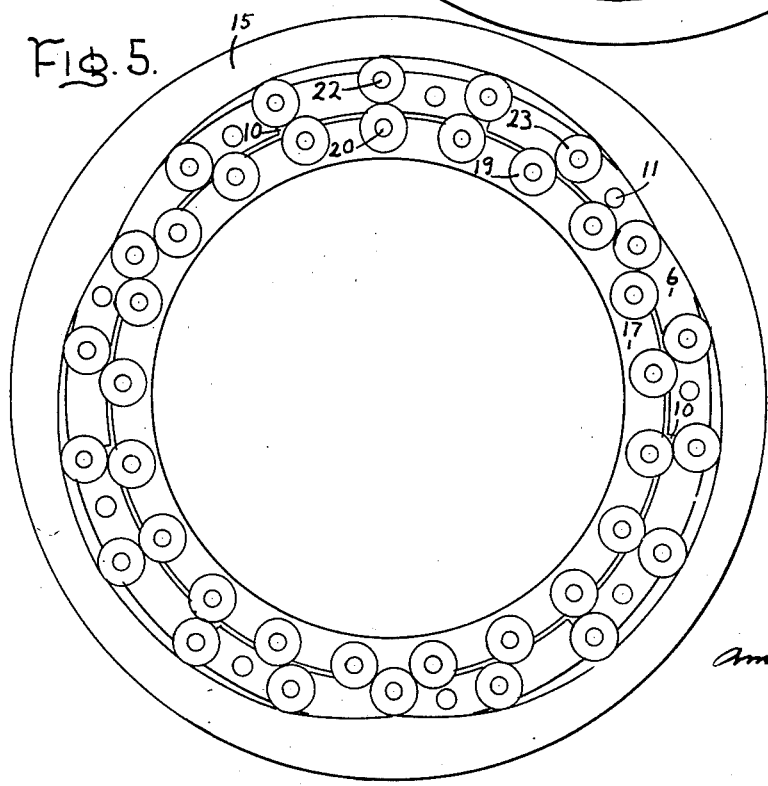

By referring to Figs. 4 and 5 it will be seen that when the difference between the number of rollers is more than one, the eccentric disappears and a perfectly balanced, axially aligned, all roller speed reducer is obtained. The reducer of Fig. 4 has 18 drive and 20 driven rollers, giving a ratio of 10 to 1. The reducer of Fig. 5 has 18 drive and 21 driven rollers, giving a ratio of 7 to 1. When the driven rollers are more in number than the driving rollers, the direction of the output shaft will be the same as that of the input shaft. When the driven rollers are less in number than the driving rollers, the direction of one shaft will be contrary to that of the other.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A speed changing device comprising, a driving shaft, a driven shaft, a plurality of unattached members, a stationary member adapted to guide said unattached members in radial movement toward an axis common to both driving and driven shafts, said driven shaft carrying a plurality of engaging members equidistant from its axis, equally spaced annularly, adapted to come in contact with said unattached members, and differing in number from said unattached members, and said driving shaft carrying a cam adapted to urge radial displacement upon said unattached members for the purpose of imparting angular rotation to said driven shaft.

2. A speed changing device comprising, a stationary member having a plurality of apertures extending radially and equally spaced annularly, a corresponding number of engaging members adapted to travel radially within said apertures, a driven shaft rotatably placed in concentricity with said stationary member and carrying a plurality of engaging members equidistant from its axis and equally spaced annularly, said engaging members differing in number from the apertures in said stationary member, and adapted to come in contact with engaging members traveling radially within apertures of stationary member, a driving shaft rotatably placed in concentricity with driven shaft, and carrying a cam adapted to urge radial displacement upon said engaging members in apertures of said stationary member, said radial displacement for the purpose of imparting angular rotation to driven shaft.

3. A speed changing device comprising a stationary member having a plurality of rectangular grooves extending radially and equally spaced annularly, a corresponding number of pins adapted to roll freely in radial direction within said grooves, each pin carrying a freely rotating roller, said stationary member rotatably supporting on both ends of its outer periphery two flanges, an internal cam supported between said flanges and rotating therewith, and adapted to urge radial displacement upon rollers guided by rectangular grooves of stationary member, a driven shaft running within said stationary member and rotatably supported in recesses in both ends of said stationary member and carrying a plurality of pins, said pins being parallel to the driven shaft, equidistant from its axis and spaced equally annularly, each carrying a freely rotating roller, and differing in number from grooves in said stationary member, said rollers adapted to come in contact with said radially displaced rollers for the purpose of imparting angular rotation to said driven shaft.

References Cited in the file of this patent

UNITED STATES PATENTS

| | | |
|---|---|---|
| 1,543,791 | Pitter | June 30, 1925 |
| 2,049,122 | Kuba | July 28, 1936 |